Figure 3:
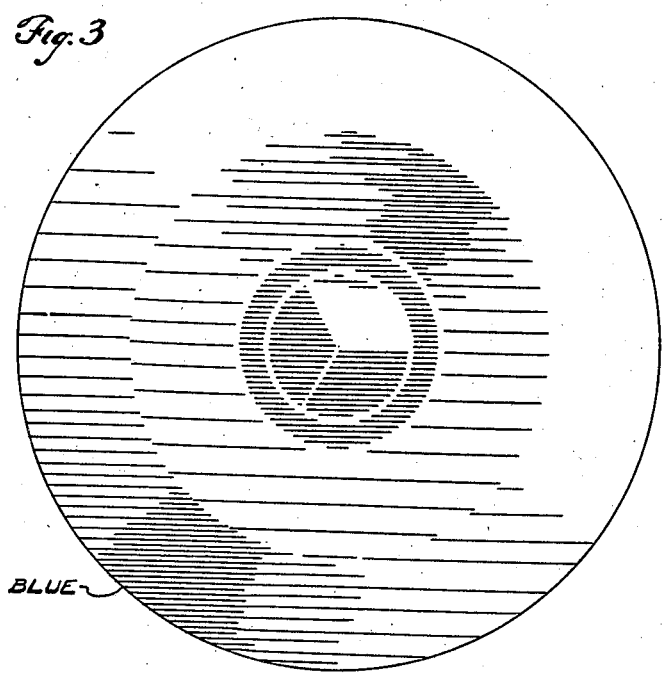

April 23, 1929.  C. W. FOSHAY  1,709,975
COLOR CHART
Filed April 25, 1924  2 Sheets-Sheet 1
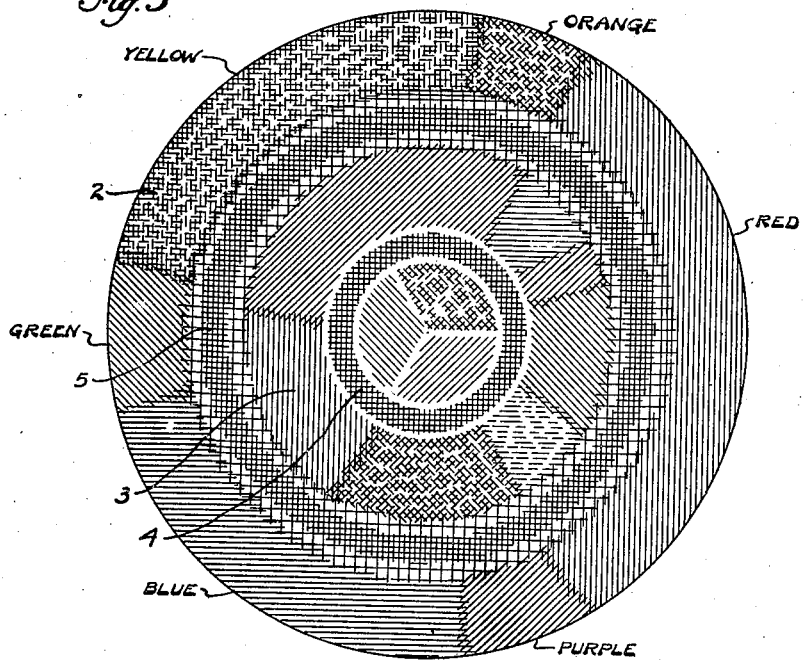
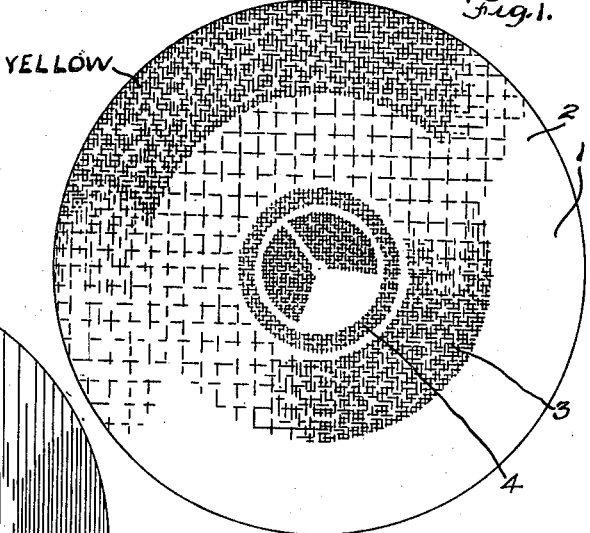
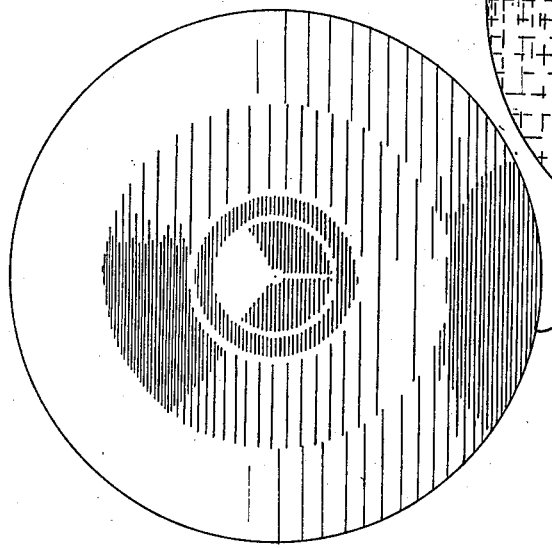
Charles Wilson Foshay,
INVENTOR
BY
HIS ATTORNEY.

April 23, 1929.  C. W. FOSHAY  1,709,975
COLOR CHART
Filed April 25, 1924   2 Sheets-Sheet 2

BLUE

BLACK

Charles Wilson Foshay,
INVENTOR

BY
His ATTORNEY.

Patented Apr. 23, 1929.

1,709,975

UNITED STATES PATENT OFFICE.

CHARLES WILSON FOSHAY, OF BROOKLYN, NEW YORK.

COLOR CHART.

Application filed April 25, 1924. Serial No. 708,959.

My invention consists of a chart in which anyone may quickly ascertain what is every possible degree of hue, strength, and luminosity that can be obtained from any set of primary colors.

My invention further consists of a chart in which all colors with their degrees of hue, and their various degrees of strength and light found in pigments are displayed in a logical and contrasting order.

Another object of my invention is to provide a standard color chart, by means of which the three well-known constants or qualities of color—namely, hue, value, and luminosity—may be so represented on a single chart so that every color will be represented.

Another object of my invention is to provide a chart having an outer band composed of the three primary colors varying in intensity from maximum to zero, or pure white, said primary colors being located approximately 120° apart on the circle, and separated by overlapping secondaries formed by washing together the two adjacent primaries. I provide a circle formed of tertiary colors washed over one another, with the red, yellow, and blue predominating at points approximately 120° from each other, and so that the colors adjacent in radial line will be complementary.

Figure 4:
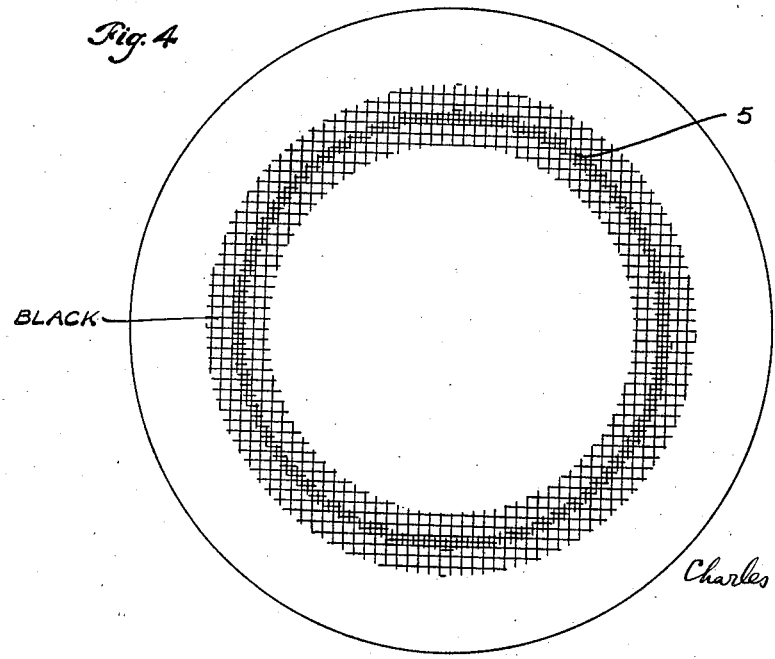

Referring to the drawings:

Figure 1 indicates a half tone plate displaying the variable intensity of the yellow which is preferably first impressed or printed on the chart made of white material;

Fig. 2 indicates a corresponding red half tone plate and the relative position thereof, which will next be impressed or printed on the chart;

Fig. 3 represents a corresponding blue half tone plate that will be impressed or printed on the chart after the yellow and red have been impressed or printed thereon;

Fig. 4 indicates a half tone plate comprising a black circle shading from intense black in the mid portion of the band to a light gray on the edges thereof, which band is impressed on the chart after the blue is impressed or printed thereon; and Fig. 5 represents half tone plate showing the completed chart.

In carrying out my invention, I print on a white material 1, a color scheme as shown in Fig. 1 of the drawings. In this figure, I impress on the chart only the yellow pigment by means of a suitable half tone plate adapted to print only those areas of the chart which correspond to the yellow of the original master painting. In constructing this chart, the outer band 2 varies in hue from white to the most intense shade of yellow, the intensity diminishing on each side of the part of greatest intensity and becoming a pure white substantially 60° from such point. A middle band 3 is also provided, having its part of greatest intensity diametrically opposite from the part of the band 2 which has the greatest intensity. The middle band 3 varies in hue, ranging from a part of greatest intensity to a diametrically opposite part of slight intensity, but the intensity of every part of the middle band 3 is greater than zero. Within, and concentric with the middle band 3 is an inner band 4 of the same intensity throughout as are those portions of the bands 2 and 3 which are of greatest intensity. Within the band 4 is a circle, which is divided into three equal sectors formed by imaginary radii meeting at an angle of 120°. The two sectors adjacent the radius, which would extend from the center of the circle to the part of greatest intensity of the band 2 have impressed thereon the pigment yellow of the same intensity as the band 4.

In Fig. 2, I have shown a color arrangement identical with that shown in Fig. 1, except that the color instead of being yellow is red, and each of the points of greatest intensity is 120° from the point of greatest intensity as shown in Fig. 1.

In Fig. 3, I have shown a color scheme indicating the pigments that are next impressed upon the chart. The color scheme shown in Fig. 3 is similar to that shown in Figs. 1 and 2, with the exception that the color is blue, and that it is spaced from the parts of greatest intensity shown in Figs. 1 and 2 by 120° respectively.

It is, therefore, obvious that in the outer band 2, there are three parts having the pure primary colors, which parts are separated from each other by 120°. Between these parts, the colors overlap so that the outer band is shaded gradually from intense yellow through all of the secondary colors formed by yellow and red to intense red, through all of the secondary colors intervening between red and blue to intense blue, and through all of the secondary colors formed by blue and yellow to yellow, but there are no tertiary colors shown on the outer band 2. The secondary colors are formed by overprinting the primary colors with color filter screens adapted to eliminate the undesirable colors and produce the desired tones of purples, greens, and oranges.

Adjacent to the outer ring 2, are shown the results of overprinting the three colors with black, which black concentric ring, as shown in Fig. 4, varies radially in each direction in intensity from pure white through all of the shades of gray to intense black.

The middle ring 3 is composed of a combination of three colors with red, yellow, and blue predominating at intervals of 120°. The tertiary colors lying between the predominating yellow, red, and blue show every variety of tertiary color. The parts of the ring 3 adjacent the rings 2 and 5 show all of the primary and secondary colors washed out with black and extending through all intensities of black from the lightest gray to the deepest black. In like manner, the portion of the band 3 adjacent the black ring shows all degrees of tertiary colors washed out with the various hues of black. Attention is in particular called to the fact that the colors of the band 2 are complementary to the colors of the band 3 at all adjacent points. That is, if a radial line is drawn from the center of the chart in any direction, that line passes through complementary colors on the bands 2 and 3.

The band 4 is black and is formed by the overprinting of the three primary chromatic colors, yellow, red, and blue.

The three sectors forming the inner circle are formed by overprinting yellow and red, forming one sector; red and blue, forming another sector; and blue and yellow, forming another sector, which produces the secondary colors orange, purple, and green, respectively.

The plates illustrated in Figs. 1, 2, 3 and 4 respectively, are prepared, in the manner customary in half tone printing from a master painting corresponding to the completed chart shown in Fig. 5. Such painting is prepared in water color, preferably by employment of an air brush which admits of the colors being washed-out from a solid color in the center to a practically zero strength at the side edges, though obviously the same could be reproduced very satisfactorily by a skilled water color painter, but at much greater expense. The various color plates necessary for reproducing an exact replica of the painting are then prepared in the usual manner, namely, each plate being prepared by photographing the master painting by employing proper color filter screens, so that only the desired color will be transmitted to the plate, for example, in producing the plate shown in Fig. 5, a color filter corresponding substantially to violet color glass will be employed and as the same will transmit only the blue and red rays, these will be the only colors to affect the photographic plate and they correspondingly will be the lightest parts of the color plate; similarly for the production of the red plate, a green filter which will eliminate the yellow and blue portions of the picture in the finished plate will be employed and likewise, for the blue plate, an orange filter is employed to eliminate the yellow and red in the plate. The so-called half tone dots are formed on the plates in the usual manner by the employment of suitable line screens through which the various photographs are made, and since the dots will be of varying depths corresponding to the intensity of the pigment in the master painting, the resultant half tone plates will each produce prints when printed alone corresponding to the illustration shown in Figs. 1, 2, 3, 4 and 5, and when these plates are overprinted in substantially the order described in the specification, they will produce a print corresponding to the portions that are outside of the outer white line of Fig. 5. Of course all the central portions of Fig. 5 which are of solid color are produced by ordinary printing.

It would, therefore, appear that I have provided a chart made up of primary, secondary, and tertiary colors, all of which are modified along the margins thereof with every strength of black, and all of which colors are so arranged on the outer and middle bands as to present the most vivid contrasts. Such a four-color process chart provides a practical means of illustrating standard process inks. By this unique arrangement of overprints, any possible combination of two, three, or four colors is shown. These process colors cover practically the entire field of three and four color process printing. The infinite variety of tones and colors which may be found on this chart is indicative of this fact. Such a chart suggests many interesting comparisons among the effects obtained by overprints and screens.

Modern methods of color printing demand every effect it is possible to secure from a single impression. The obvious economy of using every available effect in each color impression has greatly popularized the use of color. The intelligent selection of a color printing ink necessitates accurate knowledge as to just how the ink will appear when printed solid and by various strengths of screens.

It is obvious that many changes might be made in the present invention without departing from the spirit thereof. The invention is not, therefore, to be limited to the precise details of construction or method of making the same as herein illustrated and described except as required by the terms of the appended claims.

Having now described my invention, I claim:

1. A color chart consisting of a circular area divided into a plurality of concentric bands, one of said bands being formed of primary and secondary colors, the other of said bands being formed of tertiary colors, any part of either of said bands being complementary in color to the adjacent portion of the other band.

2. A color chart consisting of a plurality of concentric bands, one of said bands being provided with three primary colors, and an infinite number of secondary colors, the other of said bands being provided with an infinite number of tertiary colors, the color of any part of either band being complementary to its diametrically opposite part as well as complementary to the adjacent part of the other band.

3. A color chart consisting of a circle divided into two bands, one of said bands containing all of the primary and all of the secondary colors, the other of said bands containing all of the tertiary colors, a black band impressed over both of said bands and being washed out in a radial direction so as to vary the intensity from pure black to the combination of colors that would be produced by combining every shade of black with all of the primary, secondary, and tertiary colors.

4. A color chart consisting of a circle divided into a plurality of concentric bands, one of said bands being formed of primary and secondary colors, and the other of said bands being formed of tertiary colors, and a washed out black band separating the aforementioned bands and decreasing in intensity from its median line to its inner and outer edges, said inner and outer edges overlapping the first mentioned bands for a substantial distance.

5. A color chart consisting of a circle divided into four concentric bands, one of said bands containing all of the primary and secondary colors arranged in order, another of said bands containing all of the tertiary colors arranged in order, a black band being impressed over the inner part of the band containing the primary and secondary colors and over the outer part of the band containing the tertiary colors, said black band being washed out towards its outer and inner edges, and the innermost of said bands being composed of solid black formed by the combination of the three primary colors.

6. A color chart consisting of a circle divided into four concentric bands, one of said bands containing all of the primary and secondary colors arranged in order, another of said bands containing all of the tertiary colors arranged in order, a black band being impressed over the inner part of the band containing the primary and secondary colors and over the outer part of the band containing the tertiary colors, said black band being washed out towards its outer and inner edges, the innermost of said bands being composed of solid black formed by the combination of the three primary colors, the circle within the smallest band being occupied by three sectors, each of said sectors being formed of secondary colors formed by the union of two of the primary colors.

7. A color chart consisting of an outer band of primary and secondary colors, an intermediate band of tertiary colors, and an inner circle formed of three sectors of secondary colors, each of the secondary colors in the sectors being a complement of the diametrically opposite portion of the outer band.

Signed at New York, in the county and State of New York, this 18th day of April 1924.

CHARLES WILSON FOSHAY.